United States Patent

Gerwe

[19]

[11] Patent Number: 5,860,270
[45] Date of Patent: Jan. 19, 1999

[54] APPARATUS AND METHOD FOR SEALING PACKAGES

[75] Inventor: Thomas K. Gerwe, Cincinnati, Ohio

[73] Assignee: The Procter & Gamble Company, Cincinnati, Ohio

[21] Appl. No.: 921,681

[22] Filed: Sep. 2, 1997

[51] Int. Cl.⁶ ................................................... B65B 51/10
[52] U.S. Cl. .......................... 53/477; 53/479; 53/373.7; 53/375.9
[58] Field of Search ............................ 53/450, 477, 479, 53/550, 373.5, 373.7, 374.3, 374.5, 374.6, 375.9, 376.2

[56] References Cited

U.S. PATENT DOCUMENTS

| | | |
|---|---|---|
| 3,552,736 | 1/1971 | Frick et al. . |
| 3,685,818 | 8/1972 | Burger et al. . |
| 3,719,021 | 3/1973 | Rosenberg ................................ 53/551 |
| 3,822,528 | 7/1974 | Carlsson et al. . |
| 3,954,165 | 5/1976 | Snyder . |
| 3,961,697 | 6/1976 | Hartman et al. . |
| 4,018,432 | 4/1977 | Frick . |
| 4,074,508 | 2/1978 | Reid . |
| 4,106,260 | 8/1978 | King . |
| 4,109,792 | 8/1978 | Greenawalt et al. ................... 53/374.5 |
| 4,141,193 | 2/1979 | Joa . |
| 4,209,960 | 7/1980 | Deutschländer et al. . |
| 4,299,075 | 11/1981 | Gram ..................................... 53/374.6 |
| 4,307,800 | 12/1981 | Joa . |
| 4,325,475 | 4/1982 | Spalding . |
| 4,370,844 | 2/1983 | Degn et al. . |
| 4,374,559 | 2/1983 | Morton . |
| 4,394,898 | 7/1983 | Campbell . |
| 4,399,905 | 8/1983 | Lance et al. . |
| 4,553,377 | 11/1985 | Klinkel .................................. 53/374.6 |
| 4,650,173 | 3/1987 | Johnson et al. . |
| 4,717,375 | 1/1988 | Lundmark . |
| 4,870,802 | 10/1989 | Cerf ......................................... 53/550 |
| 5,074,096 | 12/1991 | Focke . |
| 5,081,823 | 1/1992 | van der Ent . |
| 5,218,813 | 6/1993 | Seidel . |
| 5,220,771 | 6/1993 | Burns . |
| 5,255,584 | 10/1993 | Fakler . |
| 5,271,210 | 12/1993 | Tolson . |
| 5,295,939 | 3/1994 | Ferrari et al. . |
| 5,465,824 | 11/1995 | Van Maanen . |
| 5,507,134 | 4/1996 | Takeda et al. ............................ 53/531 |

FOREIGN PATENT DOCUMENTS

| | | | |
|---|---|---|---|
| 0405354 | 2/1991 | European Pat. Off. .............. | 53/373.7 |
| 3837709 | 5/1990 | Germany .............................. | 53/374.5 |

*Primary Examiner*—James F. Coan
*Assistant Examiner*—Gene L. Kim
*Attorney, Agent, or Firm*—Dinsmore & Shohl LLP

[57] ABSTRACT

A method and apparatus for successively sealing open ends of a plurality of packages being conveyed in series along an infeed lane is provided. A sealing station aligned with the infeed lane for receiving the packages to be sealed is employed. A first package is transported from the infeed lane to the sealing station, the open end of the first packaged is engaged for sealing operations, and this engagement is maintained for a minimum sealing time while a second package is transported from the infeed lane to the sealing station. The open end of the second package is engaged for sealing operations, and the engagement is maintained for the minimum desired sealing time while a subsequent package is transported to the sealing station. These steps may then be repeated for subsequent packages. A plurality of sealing rigs moveable between receiving and holding positions may be employed for sealing operations.

20 Claims, 3 Drawing Sheets

APPARATUS AND METHOD FOR SEALING PACKAGES

BACKGROUND OF THE INVENTION

1. Field of the Invention

The present invention relates to a method for sealing packages, as well as an apparatus for the same. More particularly, the present invention provides a sealing apparatus and method which utilize a plurality of sealing rigs in order to increase package flow rates.

2. Description of Related Art

Most products are containerized in outer packages prior to shipment to consumers and other end users. The packaging step is usually an integral part of the production process, and can be a limiting factor in maximizing throughput. Thus, it is usually advantageous to optimize the speed and efficiency of this packaging step as much as possible, without adversely affecting the product quality.

Typically, products are inserted into a package comprising a bag, a box or other appropriately-sized container, and this container is then sealed in order to isolate the product from the ambient. These containers may be sealed by any of a number of means, including various types of adhesives and/or heat sealing. Heat sealing is accomplished by welding one portion of the container to another (e.g., heat welding opposing edges of a plastic bag to one another). This sealing step, however, is often not conducive to continuous manufacturing processes, since the sealing step requires the application of pressure and/or heat for a minimum period of time in order to effectuate proper sealing. This sealing time is significant, since the containers must either be paused at the sealing device for a minimum period of time, or the sealing device itself must be movable with the stream of packages. The former alternative can interrupt product flow within the manufacturing process, while the latter can be expensive to implement.

By way of example, consumer products such as diapers are typically packaged in an outer container comprising a flexible film (such as polyethylene or polypropylene) bag. The diapers are inserted through the open end of the bag, opposing sides of the open end portion of the bag are tucked inwardly, and the opposing top and bottom flaps at the open end of the bag are then affixed to one another in order to seal the bag of diapers. Typically, the opposing flaps are fused to one another by the application of heat, with or without the use of additional adhesives such as glues and the like. A pair of sealing jaws are closed about the opposing flaps in order to fuse the flaps to one another. These sealing jaws generally provide sufficient heat and pressure to fuse or weld the opposing film flaps to one another. The sealing jaws must be closed about the flaps for a minimum engagement time, however, to ensure sufficient energy transfer for a fusion of the materials. Therefore, in order to achieve higher sealing rates, and therefore a greater product throughput, product streams are often split into multiple lanes for delivery of the bagged products to multiple sealing devices.

Splitting of the product stream into multiple lanes is problematic in that the straight-line path from the bag loading station to the sealing device is no longer maintained, and control of the end flaps may be lost if additional control mechanisms are not employed. Taking additional steps to ensure that the product within the bags or containers will not be dislodged or for maintaining control of the end flaps, however, generally entails added expense, and splitting of the product stream into multiple lanes for package sealing requires additional floor space within the manufacturing facility. Alternatively, more expensive packaging materials can be employed wherein these materials have fusion properties which require shorter engagement times for the sealing jaws.

Thus, there is a need for an improved apparatus and method for sealing a stream of packages wherein multiple infeed lanes to the sealing devices are not needed, and conventional packaging materials may be employed.

SUMMARY OF THE INVENTION

It is an object of the present invention to provide a method and apparatus for sealing a stream of packages, wherein a plurality of sealing rigs are employed in order to increase product flow rates.

It is another object of the present invention to provide a method and apparatus for sealing a stream of packages employing dual sealing rigs, wherein packages are not moved away from the their straight-line path until after the sealing step has been initiated.

It is yet another object of the present invention to provide a method and apparatus for sealing a stream of packages employing dual sealing rigs, wherein each sealing rig is moveable between a receiving position aligned with the infeed lane for the packages, and holding position for completion of the sealing step.

The foregoing objects can be accomplished, in accordance with one aspect of the present invention, by providing a method for successively sealing open ends of a plurality of packages being conveyed in series along an infeed lane, wherein the open end must be held in its sealed condition for a certain minimum sealing time. This method comprises the steps of:

(a) providing a sealing station aligned with the infeed lane for receiving packages to be sealed;

(b) transporting a first package from the infeed lane to the sealing station;

(c) engaging the open end of the first package at the sealing station for sealing operations;

(d) maintaining the engagement of the first package for the minimum sealing time to seal its open end while transporting a second package from the infeed lane to the sealing station;

(e) engaging the open end of the second package at the sealing station for sealing operations;

(f) maintaining the engagement of the second package for the minimum sealing time to seal its open end while transporting a subsequent package from the infeed lane to the sealing station; and (g) repeating steps (b)–(f) as desired for subsequent packages to enable the sealing of a plurality of packages moving along the infeed lane to be sealed.

The above method preferably employs a one or more sealing rigs, and thus this method may further comprise the step of alternately moving a first sealing rig between a receiving position aligned with the infeed lane at the sealing station for receiving packages to be sealed, and a holding position for maintaining the engagement of packages for sealing operations. A second sealing rig may also be provided, and thus the method further includes the step of alternately moving a second sealing rig between a receiving position aligned with the infeed lane at the sealing station for receiving packages to be sealed, and a holding position for maintaining the engagement of packages for sealing operations, wherein the first and second sealing rigs are alternately aligned with the infeed lane.

In order to provide proper sealing time while permitting a subsequent package to be sealed, the method of the present invention may further comprise the step of moving the first package out of alignment with the infeed lane during at least a portion of the step of maintaining engagement of the first package. This may be accomplished by moving the first sealing rig, with the first package held therein, to its holding position which is out of alignment with the infeed lane. Preferably, both sealing rigs alternately move in this manner. The open end of a package should be engaged prior to the movement of the package out of alignment with the infeed lane in order to ensure that neither the package nor its contents will be dislodged. The first and second sealing rigs are also preferably linked to one another such that the step of moving one of the rigs to its holding position occurs simultaneously with the step of moving the other sealing rig to its receiving position, and thus the second sealing rig may even be positioned directly above the first sealing rig.

Each of the sealing rigs preferably comprises a pair of opposing welding jaws movable between open and closed positions, such that the step of engaging the open end of a package comprises closing the jaws about the open end. Each of the sealing rigs further comprises a package support for retaining a package thereon as the sealing rig moved to its holding position and is returned to its receiving position. Sealed packages also should be released from the sealing station, and the step of transporting a subsequent package to be sealed to the sealing station preferably assists in the release of a sealed package therefrom.

An apparatus for performing the above method is also provided. This apparatus comprises:

(a) a sealing station aligned with the infeed lane;

(b) a plurality of sealing rigs for engaging the open end of a package and maintaining engagement; and (c) an alternating mechanism adjacent the sealing station which selectively moves each sealing rig between a receiving position aligned with the infeed lane at the sealing station, and a holding position which is not immediately aligned with the infeed lane and permits another sealing rig to be aligned with the infeed lane.

Preferably, first and second sealing rigs are provided, and these rigs are linked to one another such that one of the stations is at its holding position when the other station is at its receiving position. More preferably, the first and second sealing rigs are connected to one another such that the rigs may be moved concurrently with one another. In fact, the holding position of the second sealing rig may be located above the plane of the infeed lane, with the holding position of the first sealing rig located below the plane of the infeed lane.

Each of the sealing rigs comprises a package support for holding a package thereon, and a sealing mechanism for sealing the package. This sealing mechanism may comprise a pair of welding jaws movable between open and closed positions, wherein the open end of a package may be sealed by closing the jaws about the open end. The apparatus of the present invention further preferably comprises an outfeed lane for sealed packages released from the sealing rigs. The infeed lane, the outfeed lane and the receiving position of each of the sealing rigs may therefore be aligned with one another, such that a package to be sealed may be transported from the infeed lane into a sealing rig located at its receiving position, and a sealed package may be discharged from a sealing rig located at its receiving position onto the outfeed lane.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

DESCRIPTION OF THE PREFERRED EMBODIMENTS

Figure 1:
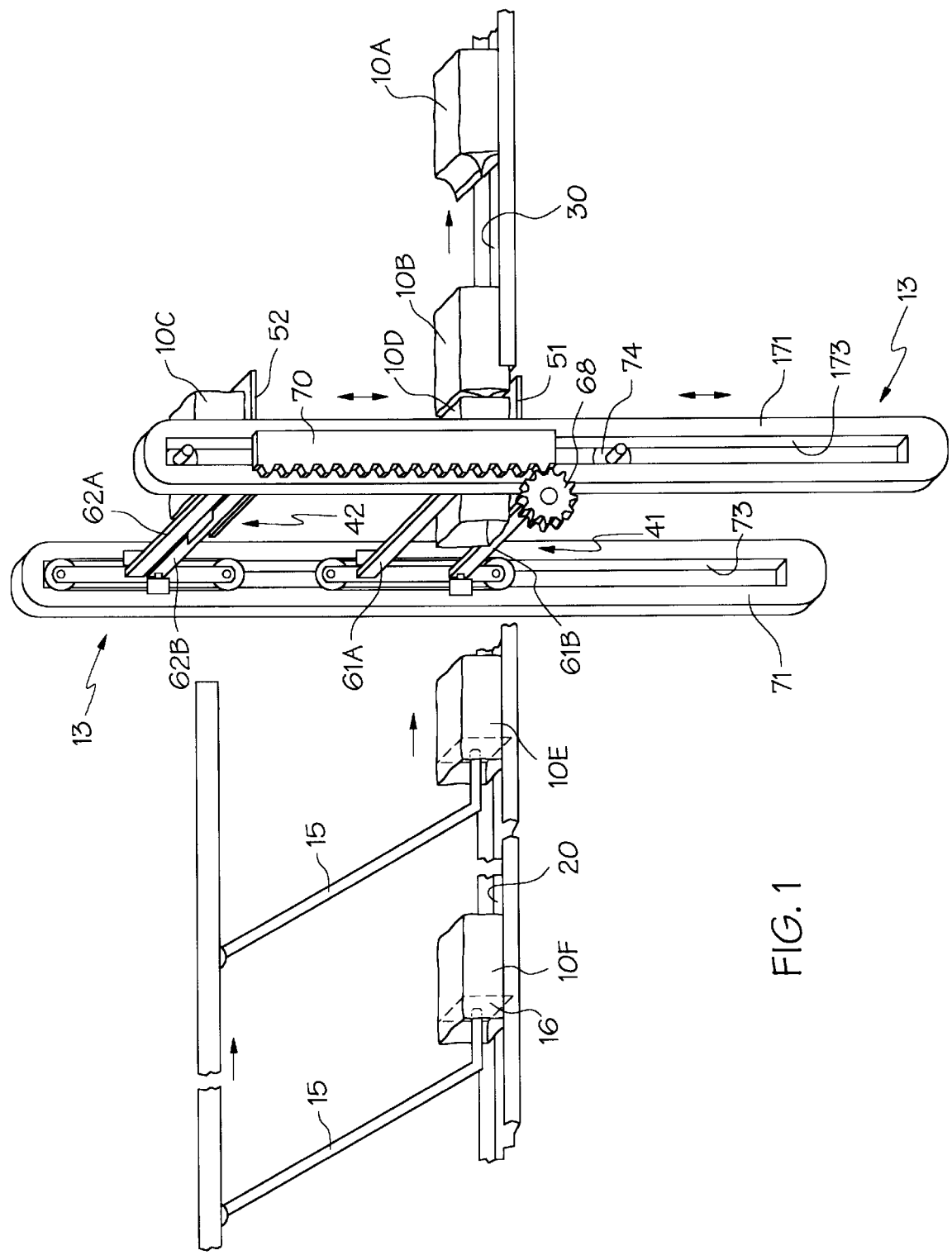
FIG. 1 is a schematic illustration of the apparatus of the present invention.

Referring now to the drawings in detail, wherein like numerals indicate similar elements throughout the views, FIG. 1 depicts the sealing apparatus of the present invention. As will be described more fully herein, this apparatus may be employed for successively sealing the open ends of a stream of packages 10A–F of which are being conveyed along an infeed lane 20 in series. By way of example, packages 1OA–F may comprise bags of diapers, incontinence pads or other consumer goods. The present invention, however, is not limited to the sealing of diaper packages, as the apparatus and method of the present invention may be employed for sealing any of a number of different types of packages.

The series of packages to be sealed are advanced along infeed lane 20 by any of a number of conventional means. In the example shown in FIG. 1, pusher bars 15 are employed for this purpose, and these pusher bars are wellknown in the art. A chain drive or other advancement means moves the pusher bars in the desired direction, and these pusher bars in turn advance the packages along infeed lane 20 towards the sealing station. Each pusher bar 15 also has an end plate 16 which is positioned inside the open end of each package in order to not only prevent the contents from becoming dislodged, but also to ensure that the end flaps remain open and controlled. Various other means may be employed for advancing the packages, however, such as conventional conveyor belts and the like. Thus, the present invention is not limited to the use of pusher bars for advancing the stream of packages along infeed lane 20.

Infeed lane 20 is downstream of the manufacturing and package-filling apparatus, and thus each of the packages advancing along infeed lane 20 have already been filled with their respective product(s). Since the open end of each package has yet to be sealed, for many products it is critical that the package be moved as smoothly as possible prior to the sealing of the flaps. Changes in the direction of movement can cause a loss of control of the flaps. For example, splitting of infeed lane 20 in order to feed the packages to multiple sealing devices may cause the end flaps of the packages to collapse. This is particularly true for thin-film, flexible packaging materials which are commonly used for packaging consumer products such as diapers, incontinence pads, and sanitary napkins. Thus, the present invention is particularly suitable for sealing packages containing these types of products.

In a conventional sealing apparatus, the stream of packages would be deposited into a single sealing device, one package at a time. After the package is properly positioned in the sealing device, a pair of mechanical tuckers tuck the opposing sides of the open end inwardly toward one another. A pair of welding jaws are then closed about the top and bottom flaps of the package in order to seal the end closed. The welding jaws, however, must remain in a closed position for a certain minimum sealing time in order to ensure proper sealing. Obviously this prevents the introduction of a new package into the sealing device until the predetermined cycle of time for sealing has expired, thereby decreasing the rate of package sealing. In fact, this conventional single sealing device method is often a rate limiting step in the overall production/packaging process.

The present invention overcomes these deficiencies by providing multiple sealing rigs wherein a new package may be introduced into a second sealing rig while the welding jaws of a first sealing rig are in the closed position for the required minimum period of time. In order to accomplish this, each sealing rig is moved out of the product flow path during the period of time in which the welding jaws are closed (i.e., the sealing time). Simultaneously, a new sealing rig is moved into the product flow path in order to accept a new package for sealing.

Figure 2:
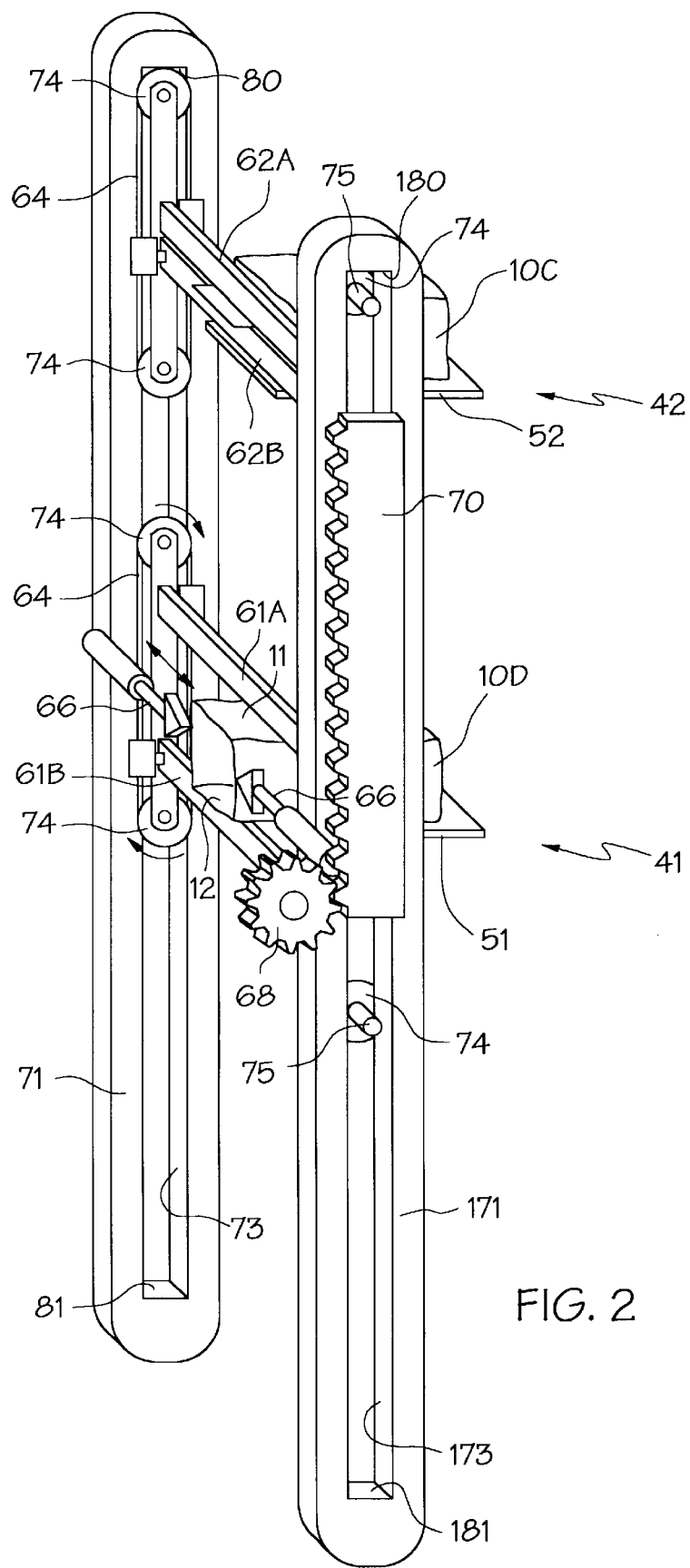
FIG. 2 is an enlarged view of the dual sealing rigs of FIG. 1.
Figure 3:
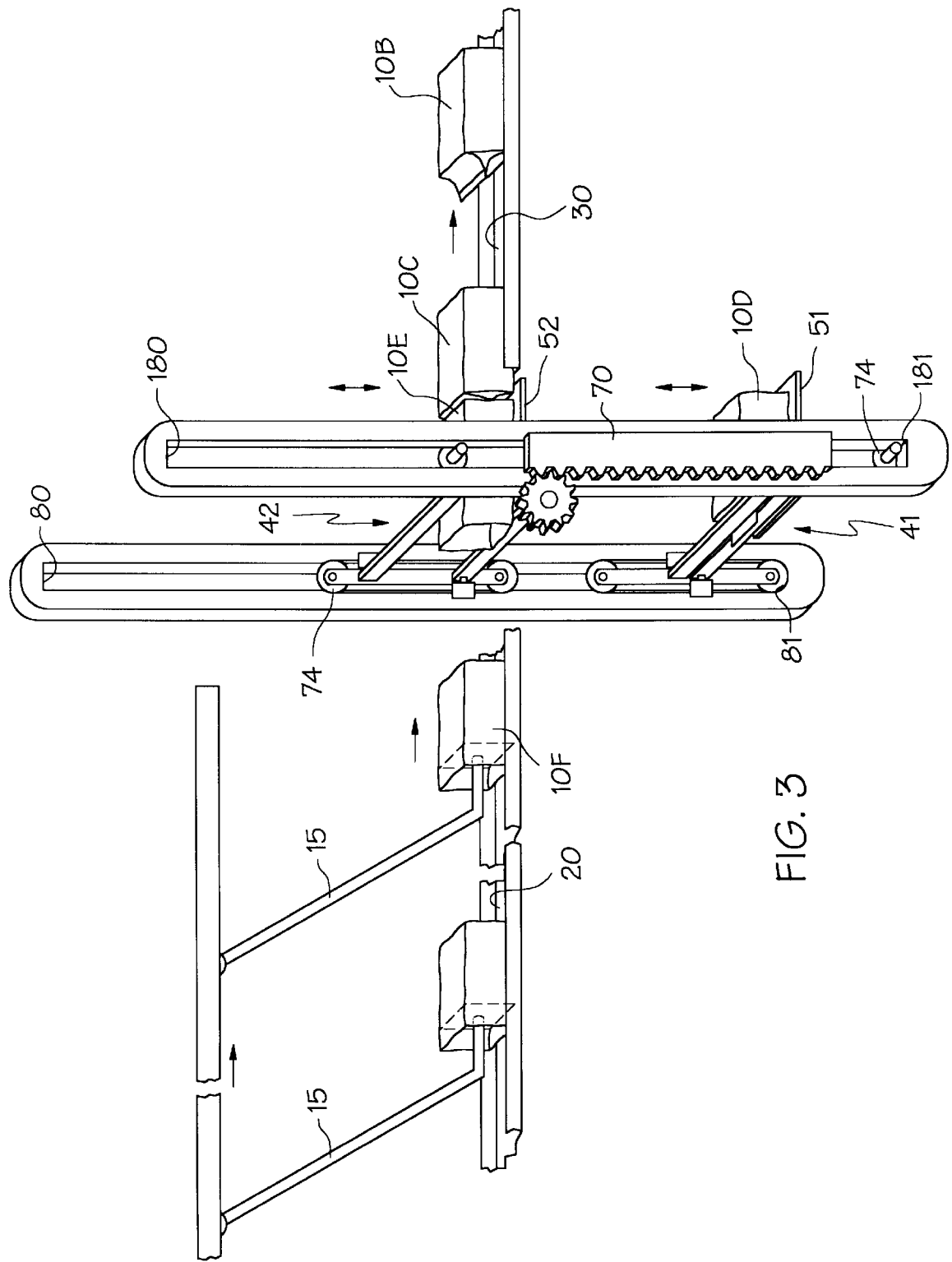
FIG. 3 is a schematic illustration of the apparatus of the present invention at a point in time subsequent to that of FIGS. 1 and 2.

Turning to FIGS. 1–3 which depict the sealing apparatus and method of the present invention, the stream of packages 10 are advanced along infeed lane 20 to the sealing station. The sealing station is defined as the region between infeed lane 20 and outfeed lane 30 which is aligned with infeed lane 20. Packages to be sealed are transported from the infeed lane to the sealing station, wherein the package sealing operation is initiated. It should be noted that a portion of infeed lane 20 has been cut-away in FIGS. 1 and 3 in order to more clearly show the apparatus of the present invention. In the embodiment shown, first and second sealing rigs 41 and 42, respectively, are provided, and each of these rigs may have conventional sealing mechanisms commonly employed for sealing packages. As will be more fully described below, each sealing rig is movable between a package receiving position aligned with the infeed lane at the sealing station, and a package holding position. The sealing rigs are preferably linked to one another such that they move in concert between their receiving and holding positions.

Each sealing rig generally comprises a package support (platforms 51 and 52) for retaining a package thereon, and a sealing mechanism for sealing the packages. Preferably, each sealing mechanism comprises a pair of opposed welding jaws movable between opened and closed positions, wherein these welding jaws may close about the open end of a package in order to seal the package. Such welding jaws are well-known in the art, and may utilize heat and/or pressure in order to seal the end flaps. Various other types of sealing mechanisms known in the art may be employed with the present invention, however, and thus the present invention is not limited to the use of opposed welding jaws. For example, ultrasonic, microwave or mechanical crimping devices may be employed to seal the flaps.

In the embodiment shown in FIGS. 1–3, first sealing rig 41 has a package support platform 51, as well as upper and lower welding jaws 61A and 61B, respectively. Likewise, second sealing rig 42 comprises a support platform 52, and upper and lower welding jaws 62A and 62B. Both sets of welding jaws are movable between an open and closed position. Thus, in the embodiment of FIGS. 1 and 2, welding jaws 61A and 61B are in their closed, or actuated, position, while welding jaws 62A and 62B are in their open position. In FIG. 3, welding jaws 61A and 61B are in their open position, while welding jaws 62A and 62B are in their closed position. Movement of the welding jaws between their open and closed positions can be accomplished by any of a number of conventional means, including a rack and pinion drive system, air-cylinders or servo motors. In the example shown, a pair of pulley wheels 74 are provided on each side of each pair of welding jaws. A chain 64 is then looped around each pair of adjacent pulley wheels, and a servo motors or other means for rotating at least one of the pulley wheels is then provided. It should be noted that the servo motor, as well as the teeth on the pulley wheels which engage the chain are not shown for purposes of clarity. Each of the welding jaws are then secured to opposite sides of chain 64 as shown, and thus when pulley wheel 74 are rotated the sealing jaws will move either towards each other or away from each other. For example, as shown in FIG. 2, when the pulley wheels 74 associated with welding jaws 61A and 61B are rotated in a clockwise direction, the welding jaws will be moved towards one another (i.e., towards their closed position). Various other alternatives can be employed for moving the welding jaws between their open and closed positions and thus the mechanism shown is merely one possible embodiment.

As also shown in FIG. 2, in order to provide a pleated closure of the open end of a package, a pair of mechanical tuckers are provided. While a pair of tuckers may be provided for each sealing rig, in the embodiment of FIG. 2, only one set of stationary tuckers 66 are provided. In order to effectuate sealing of the packages, the open end of the package is positioned between the open welding jaws of a sealing rig. For example, the open end of package 10D is positioned between welding jaws 61A and 61B in FIG. 2. The end plate 16 of each pusher bar 15 will insure that the end of the bag (i.e., the end flaps) will not collapse before bag 10D is positioned in the sealing rig as shown in FIG. 2. Mechanical tuckers 66 are each movable between a retracted position (shown in FIG. 2) and an extended position wherein the triangular shaped head of each tucker will tuck opposing sides of the open end bag inwardly towards one another. Once the sides are tucked inwardly, welding jaws 61A and 61B are then moved to their closed position thereby bringing top and bottom end flaps 11 and 12 in contact with one another. In FIG. 2, welding jaws 62A and 62B are in this closed position about the end flaps of package 10C. It should be noted that the triangular-shaped head of the tuckers shown is merely one preferred embodiment, and alterative shapes may be employed. In addition, the tuckers are preferably moved to their retracted position as welding jaws 61A and 61B are closed about flaps 11 and 12. Once the welding jaws are closed, they are maintained in this closed position for a certain minimum period of time in order to properly seal the flaps to one another.

Although the package end flaps may be provided with a pressure-sensitive adhesive, it is preferred that heat-sealable materials be employed. Thus, the welding jaws are preferably heated. In this fashion, when the welding jaws are closed about the end flaps, the heat provided by the welding jaws (as well as the pressure from the jaws) will seal the end flaps to one another by means of the heat-sealable material. In order to provide a heat-sealable material, the open end of the bag (or at least the end flaps) can be made of a suitable polymeric material having a melt point below the temperature of the welding jaws. Alternatively, strips or other discrete regions of heat-sealable material may be provided on the end flaps. Heat sealing may also be used in conjunction with conventional adhesives such as various glues and the like to provide an even stronger seal. In some instances, conventional adhesives may be used alone.

Turning now to the process shown in FIG. 1, first sealing rig 41 is located at its package receiving position at the sealing station, aligned with infeed lane 20. Second sealing rig 42 is at its package holding position (with package 10C held thereon). Package 10D to be sealed has been positioned on support platform 51 of first sealing rig 41. When a sealing rig is at its package receiving position, the welding jaws are open and the tuckers are retracted, thereby allowing a package to be positioned therein for sealing. Preferably, a package exits infeed lane 20 and passes between the open welding jaws until it rests upon the support platform. The package should be positioned on the support platform such that the open end of the package is positioned between the open welding jaws. This alignment can be ensured by any of a number of means, including controlling the movement of the packages along infeed lane 20. Alternatively (or additionally), a stop may be positioned on the support platform to prevent movement of the package beyond a certain predetermined location.

After package 10D has been properly positioned on support platform 51, the open end of the package is engaged for sealing operations. Thus, tuckers 66 are extended in order to pleat the sides, and welding jaws 61A and 61B are then closed about the top and bottom end flaps (11 and 12 in FIG. 2) in order to initiate sealing. At this point, the welding jaws not only act to seal the end flaps, but also retain the package and its contents on support platform 51. Thus, first sealing rig 41 may now be moved without risk of dislodging the contents of package 10D. After welding jaws 61A and 61B have closed about the end flaps (i.e., engage the open end of the package), sealing rig 41 is moved to its package holding position (depicted in FIG. 3). In the preferred embodiment shown, first sealing rig 41 moves downwardly in relation to the plane of infeed lane 20. While vertical movement of the sealing rigs is preferred, sealing rig 41 can also be moved to the right or left of infeed lane 20, diagonally away from infeed lane 20, or even in a looped fashion. Thus, sealing rig 41 must merely be moved away from the product flow path, out of alignment with the infeed lane, in order to permit the positioning of second sealing rig 42 for receipt of the next package to be sealed.

Sealing rig 41, with package 10D held thereon, should remain in the package holding position for a predetermined period of time, while maintaining engagement of the end being sealed. In this fashion, proper sealing of the open end of the package is accomplished. Since the sealing process begins as soon as the welding jaws are closed, however, it is not necessary that sealing rig 41 remain at its holding position for the entire time necessary for proper sealing. The total time period that the welding jaws remain closed about the end flaps is the determinative factor.

Unlike the methods and apparatus of the prior art, however, as sealing rig 41 is moved away from the sealing station toward its package holding position (FIG. 3), second sealing rig 42 is moved to its package receiving position. Thus, as shown in FIG. 3, second sealing rig 42 has now moved to its package receiving position aligned with infeed lane 20 at the sealing station. Package 10E to be sealed may now advance from infeed lane 20 onto support platform 52 in the manner described above for package 10D. Thus, the open end of package 10E is positioned between open welding jaws 62A and 62B of second sealing rig 42. Thereafter, tuckers 66 may extend to pleat the sides of the open end, and welding jaws 62A and 62B may then close about the end flaps of package 10D to begin the sealing process. Once welding jaws 62A and 62B are closed about the end flaps, second sealing rig 42 may be returned to its package holding position shown in FIG. 1. In the preferred embodiment, the package holding position for second sealing rig 42 is located above the plane of infeed lane 20. Once again, however, the most important aspect is that second sealing rig 42 be moved away from the product flow path (defined by infeed lane 20 and outfeed lane 30) and therefore sealing rig 42 may be moved laterally, diagonally, or in a looped fashion (i.e., similar to a ferris-wheel movement).

As second sealing rig 42 is moved to its package holding position, first sealing rig 41 is returned to its package receiving position at the sealing station, the welding jaws are opened, package 10D (which has now been sealed) is released from the sealing station, and is permitted to leave via outfeed lane 30. A new package to be sealed (10F) is then deposited onto support platform 51. The entire process may be repeated in a continuous fashion in order to seal a stream of packages entering the sealing apparatus of the present invention.

The timing of the above steps is such that the welding jaws remain closed about the open end (i.e., the end flaps) for the same minimum period of time as in the prior art, thereby providing an equivalent seal for the package. Because the package holding step is performed outside of the flow path of the product stream, however, overall flow rate of packages is greatly improved. With conventional sealing apparatus, the single sealing device is tied up for the duration of the sealing step, and therefore it cannot accept additional packages until the sealing step has been completed. The apparatus and method of the present invention, however, provides access to a second sealing rig during the time-consuming sealing process. This new process and apparatus is also an improvement over the splitting of infeed lanes since less factory floor space is needed. Thus, product throughput is increased significantly, while maintaining package integrity and limiting the amount of floor space needed. Although the actual time that the welding jaws are closed about the end flaps of a package does not change, Applicant's testing has demonstrated an increase in throughput of 40% or more.

Sealed packages may be urged onto outfeed lane 30 by any of a number of means, however, in the preferred embodiment after a package has been sealed and the welding jaws opened, a subsequent package entering the sealing station from infeed lane 20 will merely push the sealed package from the support platform onto outfeed lane 30. Thus, the support platform of each sealing rig should align with outfeed lane 30 when the sealing rig is in its package receiving position at the sealing station. This is best shown in FIG. 1, wherein first sealing rig 41 is at its package receiving position. Package 10D has been urged from infeed lane 20 onto support platform 52. As package 10D is urged onto support platform 52, it pushes already-sealed package 10B onto outfeed lane 30. Other mechanisms may be employed for removing sealed packages, however. For example, the support platforms may tilt towards outfeed lane 30 to permit the sealed package to slide off of the support platforms and onto outfeed lane 30.

Sealed packages removed from the sealing apparatus of the present invention along outfeed lane 30 (10B and 10C of FIG. 1) are preferably transferred to subsequent processing steps, such as loading the sealed packages into larger containers for shipment. Movement of the packages along outfeed lane 30 may be accomplished by any of a number of well-known conventional means. For example, outfeed lane 30 may comprise a moving conveyor, or pusher arms may once again be employed to effect movement in the desired direction.

Movement of each sealing rig between its respective package receiving and package holding positions can be accomplished by any of a number of wellknown means. Preferably, an alternating mechanism shown generally as 13 in FIGS. 1–3 may be provided. First and second sealing rigs 41 and 42 are linked to one another such that movement of one of the sealing rigs coincides with movement of the other. Both sealing rigs simultaneously move in the same direction and their respective movement is limited such that each of the sealing rigs is movable only between a package receiving position and a package holding position. The receiving position for each sealing rig is identical, and is preferably aligned with both infeed lane 20 and outfeed lane 30 at the sealing station. In fact, infeed lane 20, the support platform of a sealing rig at its receiving position, and outfeed lane 30, preferably define a flow path for the packages. In this manner, a substantially straight, horizontal line of travel can be maintained, with packages deviating from this path only when the welding jaws are securely closed about the end flaps of the package.

In the preferred embodiment, alternating mechanism 13 comprises left and right frame members 71 and 171 respectively, which provide a support structure for the two sealing rigs. These frame members each have an interior slot 73 and 173 within which the sealing rigs may move. Pulley wheels 74 are provided on each sealing rig, and each has a peg 75 or other extension which is positioned within slots 73 and 173 as shown. Pegs 75 ensure that the sealing rigs move in the proper line of travel between the frame members. First and second sealing rigs 41 and 42 are also linked to one another by means of linkage arm 70. Linkage arm 70 may be of any configuration, and, for example, could be merely a rigid beam secured to both sealing rigs. In the embodiment shown, however, linkage arm 70 comprises a rack which meshes with pinion gear 68. Simultaneous movement of first and second sealing rigs 41 and 42 may thus be accomplished by providing a means for rotating pinion gears 68. Preferably, a servo motor is employed in order to provide smooth, bidirectional movement, however other types of motors can be employed for this purpose. Because of the linkage of the first and second sealing rigs, as well as the use of a rack and pinion system, a single servo motor may drive a single pinion gear in order to provide the necessary movement of both sealing rigs.

While the embodiment shown in FIGS. 1–3 employs a rack and pinion drive system, alternative means for simultaneously moving first and second sealing rigs 41 and 42 may be employed. For example, a chain drive, screw drive, or belt drive may be employed for this purpose, and all are mechanisms well-known to those skilled in the art.

Regardless of the type of drive mechanism employed, it is preferred that first and second sealing rigs 41 and 42 move in a vertical plane which is substantially perpendicular to the product flow path (i.e., the flow path defined by infeed lane 20 and outfeed lane 30). In the preferred embodiment, slots 73 and 173 define the range of movement, and preferably only two dwell positions are provided. In the configuration shown in FIGS. 1 and 2, the uppermost pegs 75 on second sealing rig 42 abut against the upper surfaces 80 and 180 of slots 71 and 171, respectively. Upper surfaces 80 and 180 prevent further upward movement, and thus provide an upper dwell position wherein first sealing rig 41 is at its package receiving position and second sealing rig 42 is at it package holding position. In FIG. 3, the lowermost pegs 75 on first sealing rig 41 abut against the lower surfaces 81 and 181 of slots 71 and 171, respectively. Lower surfaces 81 and 181 prevent further downward movement of either sealing rig, and thus provide a lower dwell position wherein first sealing rig 41 is now at its package holding position and second sealing rig 42 is now at its package receiving position. In this manner, the entire sealing apparatus comprising first and second sealing rigs 41 and 42 is movable between upper and lower dwell positions. When the sealing apparatus is at either dwell position, one sealing rig is at its package receiving position at the sealing station, and the other is at its package holding position. In addition, movement between the two dwell positions only occurs after both sets of welding jaws are securely closed about the open end of a package.

It should be noted that the period of time in which the sealing apparatus remains at one of the two dwell positions may vary depending upon, among other things, the length of time needed to obtain adequate sealing, the length of time between subsequent packages being conveyed along the infeed lane, and the length of time needed for the sealing rigs to move from one dwell position to the other. In fact the dwell time, and hence the time that a sealing rig is at its package holding position, may be very slight, allowing only enough time for a sealed package to be urged from a sealing rig and replaced by a subsequent package.

While the above preferred embodiments employ two sealing rigs, the present invention also includes the provision of any number of sealing rigs. For example, three sealing rigs can be employed in a manner similar to that described above, with each sealing rig moveable between a receiving position and or more holding positions. While one of the sealing rigs is at its receiving position, the remaining two rigs may be at a holding position for completing the sealing process. Thus, three dwell positions would be needed when the alternating apparatus previously described is employed. Alternatively, a plurality of sealing rigs could also be arranged in a rotating "ferris-wheel" configuration. Each sealing rig would be moveable between a receiving position at the sealing station, and one or more holding positions. In this embodiment, the number of dwell positions would once again correspond to the number of sealing rigs, and each rig would progress in a complete loop before returning to its receiving position.

The foregoing description of preferred embodiments is by no means exhaustive of the variations in the present invention that are possible, and has thus been presented only for purposes of illustration and description. Obvious modifications and variations will be apparent to those skilled in the art in light of the teachings of the foregoing description. For example, the sealing rigs may be configured to move in a horizontal (or lateral) direction rather than vertical. In addition, various other mechanisms for providing movement to the sealing rigs other than a rack and pinion system may be employed. The packages may also be sealed by a mechanism other than a pair of welding jaws. Thus, it is intended that the scope of the present invention be defined by the claims appended hereto.

I claim:

1. A method for successively sealing open ends of a plurality of packages being conveyed in series along an infeed lane, wherein said open end must be held in its sealed condition for a certain minimum sealing time, said method comprising the steps of:

(a) providing a sealing station aligned with said infeed lane for receiving packages to be sealed;

(b) transporting a first package from said infeed lane to said sealing station;

(c) engaging the open end of said first package at said sealing station for sealing operations;

(d) maintaining the engagement of said first package for said minimum sealing time to seal its open end while transporting a second package from said infeed lane to said sealing station;

(e) engaging the open end of said second package at said sealing station for sealing operations;

(f) maintaining the engagement of said second package for said minimum sealing time to seal its open end while transporting a subsequent package from said infeed lane to said sealing station; and (g) repeating steps (b)–(f) as desired for subsequent packages to enable the sealing of a plurality of packages moving along said infeed lane to be sealed.

2. The method of claim 1, further comprising the step of alternately moving a first sealing rig between a receiving position aligned with said infeed lane at said sealing station for receiving packages to be sealed, and a holding position for maintaining the engagement of packages for sealing operations.

3. The method of claim 2, further comprising the step of alternately moving a second sealing rig between a receiving position aligned with said infeed lane at said sealing station for receiving packages to be sealed, and a holding position for maintaining the engagement of packages for sealing operations, wherein said first and second sealing rigs are alternately aligned with said infeed lane.

4. The method of claim 1, further comprising the step of moving said first package out of alignment with said infeed lane during at least a portion of the step of maintaining engagement of said first package.

5. The method of claim 1, further comprising the step of releasing sealed packages from said sealing station.

6. The method of claim 5, wherein transporting a subsequent package to be sealed to said sealing station assists in the release of a sealed package therefrom.

7. The method of claim 4, wherein the open end of said first package is engaged prior to said movement of the first package out of alignment with said infeed lane.

8. The method of claim 3, wherein said first and second sealing rigs are linked to one another such that the step of moving one of said rigs to its holding position occurs simultaneously with the step of moving the other sealing rig to its receiving position.

9. The method of claim 8, wherein said second sealing rig is positioned above said first sealing rig.

10. The method of claim 3, wherein each of said sealing rigs comprises a pair of opposing welding jaws movable between open and closed positions, and wherein the step of engaging the open end of a package comprises closing said jaws about said open end.

11. The method of claim 10, wherein each of said sealing rigs further comprises a package support for retaining a package thereon as the sealing rig is moved to its holding position and is returned to its receiving position.

12. An apparatus for successively sealing open ends of a plurality of packages being conveyed in series along an infeed lane, comprising:

(a) a sealing station aligned with said infeed lane;

(b) a plurality of sealing rigs for engaging the open end of a package and maintaining engagement; and (c) an alternating mechanism adjacent said sealing station which selectively moves each sealing rig between a receiving position aligned with said infeed lane at the sealing station, and a holding position which is not immediately aligned with the infeed lane and permits another sealing rig to be aligned with the infeed lane.

13. The apparatus of claim 12, comprising first and second sealing rigs.

14. The apparatus of claim 13, wherein said sealing rigs are linked to one another such that one of said stations is at its holding position when the other station is at its receiving position.

15. The apparatus of claim 12, wherein each of said sealing rigs comprises a package support for holding a package thereon, and a sealing mechanism for sealing said package.

16. The apparatus of claim 15, wherein said sealing mechanism comprises a pair of welding jaws movable between open and closed positions, wherein the open end of a package may be sealed by closing said jaws about said open end.

17. The apparatus of claim 14, wherein said first and second sealing rigs are connected to one another such that said rigs may be moved concurrently with one another.

18. The apparatus of claim 14, wherein the holding position of said second sealing rig is located above the plane of said infeed lane, and the holding position of said first sealing rig is located below the plane of said infeed lane.

19. The apparatus of claim 12, further comprising an outfeed lane for sealed packages released from said sealing rigs.

20. The apparatus of claim 19, wherein said infeed lane, said outfeed lane and the receiving position of each of said sealing rigs are aligned with one another, such that a package to be sealed may be transported from said infeed lane into a sealing rig located at its receiving position, and a sealed package may be discharged from a sealing rig located at its receiving position onto said outfeed lane.

* * * * *